(12) United States Patent
Solterbeck

(10) Patent No.: US 10,436,398 B2
(45) Date of Patent: Oct. 8, 2019

(54) OVERHEAD MULTI-FUNCTIONAL FIXTURE

(71) Applicant: William D. Solterbeck, Hampton, VA (US)

(72) Inventor: William D. Solterbeck, Hampton, VA (US)

( * ) Notice: Subject to any disclaimer, the term of this patent is extended or adjusted under 35 U.S.C. 154(b) by 0 days.

(21) Appl. No.: 16/350,051

(22) Filed: Sep. 20, 2018

(65) Prior Publication Data

US 2019/0086045 A1 Mar. 21, 2019

Related U.S. Application Data

(60) Provisional application No. 62/606,395, filed on Sep. 21, 2017.

(51) Int. Cl.
| | | |
|---|---|---|
| *F21S 8/02* | (2006.01) |
| *F21V 15/01* | (2006.01) |
| *F21V 21/108* | (2006.01) |
| *F21V 23/06* | (2006.01) |
| *F21V 33/00* | (2006.01) |
| *F21V 23/04* | (2006.01) |
| *A47B 83/02* | (2006.01) |
| *A47B 33/00* | (2006.01) |
| *A47C 3/18* | (2006.01) |
| *A47C 7/56* | (2006.01) |
| *F16M 13/02* | (2006.01) |

(Continued)

(52) U.S. Cl.
CPC .............. *F21S 8/026* (2013.01); *A47B 33/00* (2013.01); *A47B 83/02* (2013.01); *A47B 83/0213* (2017.08); *A47B 83/0215* (2017.08); *A47C 3/18* (2013.01); *A47C 7/563* (2013.01); *F16M 13/027* (2013.01); *F21V 15/01* (2013.01); *F21V 21/108* (2013.01); *F21V 23/0435* (2013.01); *F21V 23/06* (2013.01); *F21V 33/0052* (2013.01); *F21V 33/0056* (2013.01); *A47B 2051/005* (2013.01); *F21Y 2115/10* (2016.08)

(58) Field of Classification Search
CPC ........ F21S 8/026; F21V 15/01; F21V 21/108; F21V 23/0435; F21V 23/06; F21V 33/0056; F21V 83/0052; A47B 83/0213; A47B 83/0215; A47B 83/02; A47B 33/00; A47C 3/18; A47C 7/563; F16M 13/027

See application file for complete search history.

(56) References Cited

U.S. PATENT DOCUMENTS

| | | | | |
|---|---|---|---|---|
| 3,786,575 A | * | 1/1974 | Riblett .................. | A45D 20/22 219/220 |
| 2007/0247854 A1 | * | 10/2007 | Lin ....................... | F04D 25/088 362/294 |
| 2008/0285271 A1 | * | 11/2008 | Roberge ................ | F21S 8/033 362/235 |

* cited by examiner

*Primary Examiner* — Thomas M Sember
(74) *Attorney, Agent, or Firm* — Jeffrey F. Riddle

(57) ABSTRACT

A ceiling mountable unitized fixture providing amenities to people at a desk or table below is shown and described. The unitized fixture can provide in or on a housing, a variety of types of lighting, for serving different types of activities. Auxiliary power is available, either as a fixed, in-place electrical receptacle or alternatively, as a retractable receptacle. An air distribution manifold can be connected to a building heating and/or cooling forced air system, enabling air to be directed downwardly to those seated at a table below. Optionally, a speaker and one or more video screens may be incorporated. Lighting, electrical receptacle extension and retraction, audio, and video screens may be remotely controlled.

19 Claims, 2 Drawing Sheets

(51) Int. Cl.
*A47B 51/00* (2006.01)
*F21Y 115/10* (2016.01)

OVERHEAD MULTI-FUNCTIONAL FIXTURE

FIELD OF THE INVENTION

The present invention relates to a utilities fixture to be ceiling mounted above a dining table or the like, the fixture providing a variety of lighting, dispensing heating or cooling air, in-place or retractable electrical receptacles, and optionally, audio and video equipment.

BACKGROUND OF THE INVENTION

People engaged in activities such as dining or working at a desk are frequently in need of amenities such as supplementary or even principal lighting, heating and/or cooling, access to electrical receptacles, and audio and/or video terminals. This is particularly true in commercial applications, such as restaurants and venues for presentations, speeches, and the like. The above amenities are well known and commercially available, but must typically be installed individually at any given site.

There exists a need for a pre-fabricated unit supplying some or all of the above amenities, enabling expeditious installations at appropriate venues.

SUMMARY OF THE INVENTION

The present invention provides a unitized fixture combining some or all of the above cited amenities. The unitized fixture enables many needs to be expeditiously fulfilled in a construction phase of building or remodeling. The fixture can be made aesthetically pleasing despite its utilitarian nature.

In particular, the fixture can provide a variety of types of lighting, for serving different types of activities. Auxiliary power is available, either as a fixed, in-place receptacle or alternatively, as a retractable receptacle. An air distribution manifold can be connected to a building heating and/or cooling forced air system, enabling air to be directed downwardly to those seated at a table below. Optionally, a speaker and one or more video screens may be incorporated.

The present invention provides improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
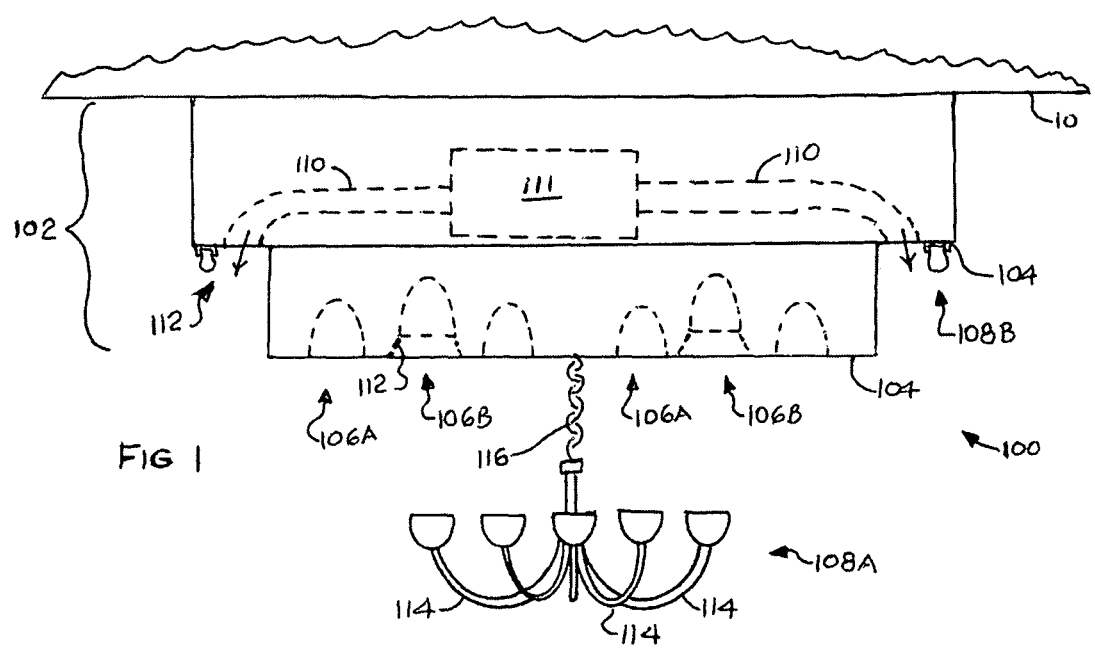
FIG. 1 is a diagrammatic, side elevational view of a multi-utility ceiling fixture according to at least one aspect of the invention.

Referring first to FIG. 1, according to at least one aspect of the invention, there is shown a multi-utility ceiling fixture 100 which may comprise a housing 102 including a bottom surface 104 facing downwardly when housing 102 is coupled to an environmental surface thereabove. The housing may comprise a first tier and a lower second tier having a dimension less than a corresponding dimension of the first tier. Multi-utility ceiling fixture 100 may further comprise at least one first lighting unit 106A or 106B, wherein first lighting unit 106A or 106B projects light downwardly when multi-utility ceiling fixture 100 is fastened to a downwardly facing environmental surface and does not project outside housing 102, and at least one second lighting unit 108A or 108B wherein second lighting unit 108A or 108B projects outside and depends from housing 102, and an air distribution system having at least one internal air distribution conduit 110 including at least one discharge opening 112 facing downwardly when multi-utility ceiling fixture 100 is fastened to a downwardly facing environmental surface. The environmental surface may be a ceiling 10 for example. Internal air distribution conduits 110 may be connected to a plenum chamber 111 as depicted, and may branch or manifold to provide many discharge openings 112. In unillustrated embodiments, plenum chamber 111 may include a blower for propelling air, heating elements, and/or a cooling plant as desired. However, it is also contemplated that plenum chamber 111 or internal air distribution conduits 110 may be connected to a heating, cooling, or ventilation system (not shown) which is part of the building to be modified by installation of multi-utility ceiling fixture 100.

Figure 2:
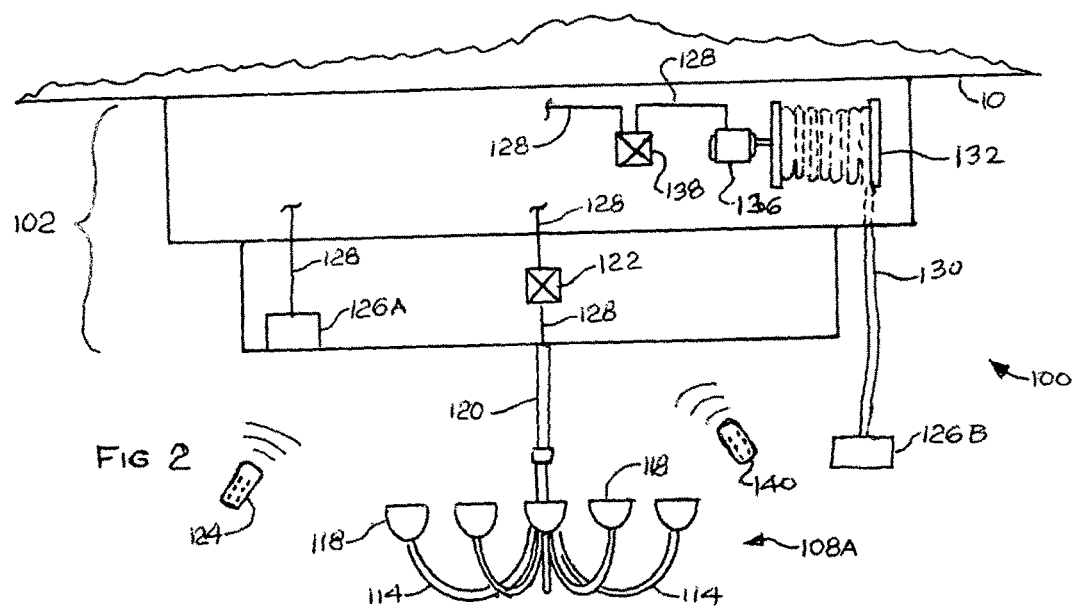
FIG. 2 is a diagrammatic, side elevational view of a multi-utility ceiling fixture according to additional aspects of the invention.
Figure 3:
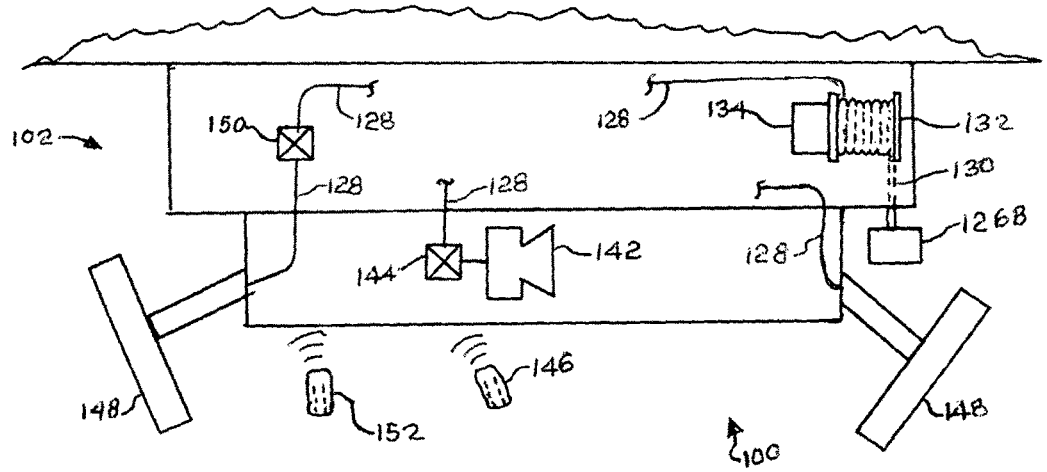
FIG. 3 is a diagrammatic, side elevational view of a multi-utility ceiling fixture according to further aspects of the invention, wherein FIGS. 1-3 each show limited aspects of the invention, with some components omitted from each view to preserve clarity of the respective view.

In FIG. 1, the first tier is shown as a rectangle enclosing internal air distribution conduits 110 and plenum chamber 111. The second tier is shown as a rectangle enclosing first lighting units 106A and 106B. In FIG. 2, the first tier is shown as a rectangle enclosing a reel 132. The second tier is shown as a rectangle enclosing light controller 122 and light receptacle 126A. In FIG. 3, the first tier is shown as a rectangle enclosing reel 132 and speaker 142. In all examples, the second tier has a dimension less than a corresponding dimension of the first tier.

It should be noted that where a plurality of similar components such as first lighting units 106A are present, not every one of such components is called out by reference numeral. It will be understood that unnumbered components drawn similarly to numbered components are additional examples of the numbered components.

It should be noted at this point that orientational terms such as bottom and downwardly refer to the subject drawing as viewed by an observer. The drawing figures depict their subject matter in orientations of normal use, which could obviously change with changes in posture and position of the novel multi-utility ceiling fixture 100. Therefore, orientational terms must be understood to provide semantic basis for purposes of description, and do not limit the invention or its component parts in any particular way.

As depicted, housing 102 is tiered, although in other implementations, housing 102 may not be tiered, or alternatively, may include more than two tiers. Regardless of the number of tiers, bottom surface 104 will be understood to include all downwardly facing surfaces of housing 102 regardless of the number of tiers.

Unless otherwise indicated, the terms "first", "second", etc., are used herein merely as labels, and are not intended to impose ordinal, positional, or hierarchical requirements on the items to which these terms refer. Moreover, reference to, e.g., a "second" item does not either require or preclude the existence of, e.g., a "first" or lower-numbered item, and/or, e.g., a "third" or higher-numbered item.

In multi-utility ceiling fixture 100, at least one first lighting unit 106B may be recessed within housing 102. The at least one first lighting unit 106B may comprise a light discharge opening 112 flush with housing 102. Although drawn identically, first lighting units 106A, 106B may differ not only in mounting within housing 102, but may be provided as identical or different light fixture types. First lighting units 106A, 106B may comprise light emitting diodes (LEDs) individual or mounted on a common strip, individual lamps, or may be of still other types.

Second lighting units 108A, 108B, while sharing the characteristic that each projects outside or beyond housing 102, may differ significantly in other characteristics. Illustratively, second lighting unit 108A may comprise a variable direction connector supported at housing 102, whereby direction of propagation of light from the at least one second lighting unit 108A is variable relative to housing 102. As depicted, second lighting unit 108A may further comprise a plurality of arms 114 supported from the variable direction connector, and with at least one light emitting element on each arm 114. This construction is typical of chandelier type lighting fixtures, wherein the variable direction connector may comprise a chain 116 of separate links which can vary in their alignment relative to adjacent links. Alternatively, the variable connector may comprise a ball joint, a hook engaging an eye, or other movable connection (none shown). Second lighting unit 108B may comprise track lighting as shown, may comprise a strip of LEDs, may comprise individual lamps, or may be of still different types.

As shown in FIG. 2, in an implementation of multi-utility ceiling fixture 100, second lighting unit 108A may further comprise a fixed direction connector supported at housing 102, wherein the at least one second lighting unit 108A further comprises a plurality of arms 114 supported from the fixed direction connector and at least one light emitting element 118 on each arm 114. In this implementation, the fixed direction connector may comprise a rigid, non-jointed tube 120 for example. Light emitting elements may comprise incandescent bulbs, LEDs, and other types of lighting elements, either single or plural within each light emitting element 118.

It must be borne in mind that because the Drawing Figures are diagrammatic, they may show some elements in abbreviated form or may omit elements entirely. For example, electrically operated components such as first and second lighting units 106A, 106B, 108A, and 108B may be shown without bulbs or other specific light generating parts, may be shown with incomplete electrical circuitry 128, or may omit circuitry 128, fasteners, and other essential elements altogether. Where shown, circuitry 128 will be understood to include the number of conductors, connections, switches or other controllers, protective devices such as fuses and circuit breakers, and other well known components which may be necessary to perform the functions described herein.

Still referring to FIG. 2, multi-utility ceiling fixture 100 may further comprise a hand held, portable remotely operated light controller 122 at the housing, and a remote controller 124 configured to control at least one of first lighting unit 106A or 106B and second lighting unit 108A or 108B remotely via light controller 122. Light controller 122 and associated remote controller 124 may be of the radiant energy type, such as utilizing infrared light, radio frequency signals, etc.

Multi-utility ceiling fixture 100 may further comprise at least one electrical receptacle 126A or 126B on housing 102. Where provided, electrical receptacle 126A may be fixed in place within housing 102. Alternatively, where provided, electrical receptacle 126B may be of the pendant type wherein electrical circuitry comprises a flexible portion 130 enabling electrical receptacle 126B to project from housing 102 for remote use. Regardless of whether electrical receptacles 126A, 126B are fixed in place or pendant, multi-utility ceiling fixture 100 may further comprise electrical circuitry 128 configured at a proximal end to be connected to external electrical circuitry (not shown) and electrically connected at a distal end to electrical receptacle 126A or 126B. The external circuitry may be that provided as part of the building in which multi-utility ceiling fixture 100 is installed.

To facilitate dispensing and retraction of electrical receptacle 126B, may comprise a reel 132 enabling electrical receptacle 126B to remain at a selected degree of projection from housing 102 and to retract into housing 102. To this end, reel 132 may comprise a known inertia control feature 134 (FIG. 3) enabling retraction of electrical receptacle 126B from a projected condition when electrical receptacle 126B is drawn further from housing 102 and immediately released. Extension and retraction of electrical receptacle is performed manually.

In a variation of reel 132, it is possible to power extension and retraction of electrical receptacle 126B. With continued reference to FIG. 2, multi-utility ceiling fixture 100 may further comprise a reversible motor 136 arranged to operate reel 132 to selectively extend electrical receptacle 126B to and retract electrical receptacle 126B from a projected condition, as illustrated in FIG. 2. Multi-utility ceiling fixture 100 may further comprise a remotely operated motor controller 138 at housing 102, and a remote controller 140 configured to control reversible motor 136 remotely via remotely operated motor controller 138. Remote controller 140 may be similar in type to remote controller 124.

Turning now to FIG. 3, multi-utility ceiling fixture 100 may further comprise a speaker 142 mounted in housing 102. Multi-utility ceiling fixture 100 may further comprise a controller 144 operating speaker 142, and a remote controller 146 configured to enter commands to controller 144 to operate speaker 142. Remote controller 146 may be similar in type to remote controller 124.

Multi-utility ceiling fixture 100 may further comprise a video screen 148 supported from and visible from housing 102. Two video screens 148 are shown in FIG. 3. For controlling video screens 148 individually or together, multi-utility ceiling fixture 100 may further comprise a controller 150 operating video screen(s) 148, and a remote controller 152 configured to enter commands to controller 150 to operate video screen(s) 148.

Controllers 122, 138, 144, 150 and their associated hand held, portable remote controllers 124, 140, 146, and 152 will be understood to include all components necessary for operation as described, such as microprocessor, antenna, power supply, input control buttons, etc.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A multi-utility ceiling fixture, comprising:
    a housing including a bottom surface facing downwardly when the housing is coupled to an environmental surface thereabove, the housing comprising a first tier and a lower second tier having a dimension less than a corresponding dimension of the first tier;
    at least one first lighting unit wherein the first lighting unit projects light downwardly when the multi-utility ceiling fixture is fastened to a downwardly facing environmental surface and does not project outside the housing, and at least one second lighting unit wherein the second lighting unit projects outside and depends from the housing; and
    an air distribution system having at least one internal air distribution conduit including at least one discharge opening facing downwardly when the multi-utility ceiling fixture is fastened to a downwardly facing environmental surface.

2. The multi-utility ceiling fixture of claim 1, wherein the at least one lighting unit is recessed within the housing.

3. The multi-utility ceiling fixture of claim 1, wherein the at least one first lighting unit comprises a light discharge opening flush with the housing.

4. The multi-utility ceiling fixture of claim 1, wherein the at least one second lighting unit comprises a variable direction connector supported at the housing, whereby direction of propagation of light from the at least one second lighting unit is variable relative to the housing.

5. The multi-utility ceiling fixture of claim 4, wherein the at least one second lighting unit further comprises a plurality of arms supported from the variable direction connector and at least one light emitting element on each said arm.

6. The multi-utility ceiling fixture of claim 1, further comprising a fixed direction connector supported at the housing, wherein the at least one second lighting unit further comprises a plurality of arms supported from the fixed direction connector and at least one light emitting element on each said arm.

7. The multi-utility ceiling fixture of claim 1, further comprising a remotely operated light controller at the housing, and a remote controller configured to control at least one of the first lighting unit and the second lighting unit remotely via the light controller.

8. The multi-utility ceiling fixture of claim 1, further comprising at least one electrical receptacle on the housing.

9. The multi-utility ceiling fixture of claim 8, further comprising electrical circuitry configured to be connected to external electrical circuitry and electrically connected to the electrical receptacle.

10. The multi-utility ceiling fixture of claim 9, wherein the electrical circuitry comprises a flexible portion enabling the electrical receptacle to project from the housing for remote use.

11. The multi-utility ceiling fixture of claim 10, wherein the electrical circuitry further comprises a reel enabling the electrical receptacle to remain at a selected degree of projection from the housing and to retract into the housing.

12. The multi-utility ceiling fixture of claim 11, wherein the reel comprises an inertia control feature enabling retraction of the electrical receptacle from a projected condition when the electrical receptacle is drawn further from the housing and immediately released.

13. The multi-utility ceiling fixture of claim 11, further comprising a reversible motor arranged to operate the reel to selectively extend the electrical receptacle to and retract the electrical receptacle from a projected condition.

14. The multi-utility ceiling fixture of claim 13, further comprising a remotely operated motor controller at the housing, and a remote controller configured to control the reversible motor remotely via the remotely operated motor controller.

15. The multi-utility ceiling fixture of claim 1, further comprising a speaker mounted in the housing.

16. The multi-utility ceiling fixture of claim 15, further comprising a controller operating the speaker, and a remote controller configured to enter commands to the controller to operate the speaker.

17. The multi-utility ceiling fixture of claim 1, further comprising a video screen supported from and visible from the housing.

18. The multi-utility ceiling fixture of claim 17, further comprising a controller operating the video screen, and a remote controller configured to enter commands to the controller to operate the video screen.

19. A multi-utility ceiling fixture, comprising:
    a housing including a bottom surface facing downwardly when the housing is coupled to an environmental surface thereabove;
    at least one first lighting unit wherein the first lighting unit does not project outside the housing, and at least one second lighting unit wherein the second lighting unit projects outside the housing; and
    an air distribution system having at least one internal air distribution conduit including at least one discharge opening facing downwardly when the multi-utility ceiling fixture is fastened to a downwardly facing environmental surface, further comprising
    at least one electrical receptacle on the housing,
    electrical circuitry configured to be connected to external electrical circuitry and electrically connected to the electrical receptacle, wherein
        the electrical circuitry comprises a flexible portion enabling the electrical receptacle to project from the housing for remote use, and
        the electrical circuitry further comprises a reel enabling the electrical receptacle to remain at a selected degree of projection from the housing and to retract into the housing.

* * * * *